(12) United States Patent
Kawasaki et al.

(10) Patent No.: US 7,161,716 B1
(45) Date of Patent: Jan. 9, 2007

(54) IMAGE READING APPARATUS

(75) Inventors: Shigeru Kawasaki, Yokohama (JP);
Hirotoshi Kishi, Nakano-ku (JP);
Tsuyoshi Yamauchi, Kawasaki (JP);
Toshio Takahashi, Toda (JP)

(73) Assignee: Canon Kabsuhiki Kaisha, Tokyo (JP)

( * ) Notice: Subject to any disclaimer, the term of this patent is extended or adjusted under 35 U.S.C. 154(b) by 489 days.

(21) Appl. No.: 09/655,487

(22) Filed: Sep. 5, 2000

(30) Foreign Application Priority Data

Sep. 6, 1999 (JP) .................................. 11-251707
Sep. 14, 1999 (JP) .................................. 11-261065

(51) Int. Cl.
*H04N 1/04* (2006.01)

(52) U.S. Cl. ...................... 358/497; 358/474; 358/471; 355/75

(58) Field of Classification Search ........ 358/497–498, 358/494, 471–474, 483, 505; 399/211; 250/208.1, 250/234, 235, 236; 355/75, 40
See application file for complete search history.

(56) References Cited

U.S. PATENT DOCUMENTS

| | | | | |
|---|---|---|---|---|
| 4,835,619 | A | * | 5/1989 | Kobori et al. .............. 358/498 |
| 6,002,508 | A | * | 12/1999 | Mai ........................... 359/212 |
| 6,175,406 | B1 | * | 1/2001 | Iizuka et al. .................. 355/75 |
| 6,330,084 | B1 | * | 12/2001 | Chiang ....................... 358/497 |
| 6,339,214 | B1 | * | 1/2002 | Takakura et al. ........ 250/208.1 |
| 6,631,014 | B1 | * | 10/2003 | Aoshima et al. ............ 358/497 |
| 6,710,898 | B1 | * | 3/2004 | Chang ........................ 358/474 |

* cited by examiner

*Primary Examiner*—Thomas D. Lee
*Assistant Examiner*—Heather D Gibbs
(74) *Attorney, Agent, or Firm*—Fitzpatrick, Cella, Harper & Scinto

(57) ABSTRACT

The present invention provides an image reading apparatus comprising a scanning member movable along an original mounting table and provided with a reading element for reading an original image, a frame member housing the scanning member, and a control board adapted for controlling the scanning member and provided in the frame member, wherein the control board is so positioned that, when the scanning member moves toward the control board, a portion protruding under the scanning member does not pass on the control board.

5 Claims, 13 Drawing Sheets

IMAGE READING APPARATUS

BACKGROUND OF THE INVENTION

1. Field of the Invention

The present invention relates to an image reading apparatus and more particularly to an image reading apparatus capable of reading an original such as a document or a photograph, executing conversion into digital data and outputting the obtained image data, and adapted for use for computer input.

2. Related Background Art

At first there will be explained a conventional image reading apparatus with reference to the accompanying drawings. FIG. 13 is a schematic view showing the configuration of a color image reading apparatus, and FIGS. 14A and 14B are respectively a plan view and a cross-sectional view of the conventional image reading apparatus, in which same or equivalent components are represented by a same number.

In the conventional image reading apparatus, as shown in FIG. 13, an original P is placed on an original mounting glass 100 supported by a cover 111 and an original cover 112 is then closed to press the original P to the original mounting glass 100.

Then a reading unit 101 shown in FIGS. 14A and 14B performs a scanning motion parallel to the original mounting glass 100 to read the image on the original P.

The reading unit 101 is provided therein with LED's of three colors (R, G and B) constituting light sources for illuminating the original, an image sensor and a rod lens array for focusing the light reflected from the original P onto the photosensor elements of the image sensor.

The light sources of three colors are turned on in succession and the image sensor reads the light of respective color reflected from the original P to execute color-separated image reading.

In the conventional image reading apparatus, as shown in FIG. 14A, the reading unit 101 is fixed to and supported by a slider 102 which is rendered slidable on a guide shaft 103 fixed to the main body of the apparatus.

Also a belt 104 for transmitting the driving power from a motor 105, constituting scanning drive source, is fixed to the slider 102.

The reading unit 101 is rendered capable of reciprocating scanning motion within a range of the original mounting glass 100 by the forward and reverse rotation of the motor 105. In this operation, the load torque T on the motor shaft can be simply represented as follows:

$$T = F \times D/2 \times i \times 1/\eta$$

wherein F: load in the axial direction, D: diameter of final pulley, i: reducing ratio, and $\eta$: mechanical efficiency, so that the load torque T is dependent on the changing ratio.

In case of using flat gears as in the conventional configuration, the changing ratio is represented by the ratio of teeth of the changing gears, and such ratio is generally selected within a range of about 0.1 to 0.3 because of the limitation in the external dimension of the image reading apparatus.

For driving such apparatus, there is generally required a motor of a diameter of 40$\phi$.

As shown in FIGS. 14A and 14B, the image reading apparatus is also provided, as a constituent component, with an electric unit 106 consisting of a control board, a power source etc. These components are housed in a cover 111 supporting the original mounting glass 100.

The above-described conventional technology is however associated with a drawback that the reduction in the dimension and thickness of the image reading apparatus is difficult to achieve.

For example, in the prior technology shown in FIGS. 13, 14A and 14B, in order to reduce the size (height in particular) of the image reading apparatus, the electric unit 106 including a driving system for driving the reading unit 101 and a control board for controlling the entire image reading apparatus is positioned outside the scanning area of the reading unit 101.

Consequently the dimension of the apparatus is reduced in the height, but the longitudinal or transversal dimension becomes larger than the scanning area by the size of the driving system and of the control board. If the electric unit 106 is positioned inside the scanning area of the reading unit 101, the height of the apparatus inevitably increases in order to avoid the interference between the electric unit 106 and the reading unit 101.

It is therefore conceivable to remove the power source, which is bulky in thickness, from the electric unit 106 and receive the electric power for driving the apparatus from an external equipment such as a personal computer thereby only positioning the control board within the scanning area. As the component parts of the power source are bulky, the removal thereof is effective for reducing the height of the apparatus.

However, the thickness of the control board also becomes a barrier for further reducing the height of the apparatus, since a protrusion is more or less present on the bottom face of the reading unit 101 and interferes with the control board.

Though it is possible to reduce the thickness of the control board by replacing all the components mounted on the control board with surface mounted components, there will inevitably result a significant increase in the cost.

It is also possible to suppress the height of the control board by mounting parts requiring a relatively large dimension in the height, such as electrolytic capacitors, in a flatly lying position, but there is required a certain clearance between the control board and a cover therefor in consideration of the bending of the two.

Furthermore, the compactization is inevitably limited since there is required a certain clearance to the scanning member.

SUMMARY OF THE INVENTION

The present invention has been obtained in consideration of the foregoing, and an object of the present invention is to provide a compact image reading apparatus.

Another object of the present invention is to provide an image reading apparatus of a reduced thickness.

In one aspect, the present invention is an image reading apparatus that comprises a scanning member, movable along an original mounting table, that includes a reading element for reading an original image. A frame member, which has a rib, houses the scanning member. A control board is provided for controlling the scanning member, and an interface connector is connected to a signal line of an external apparatus, and is mounted on a side of the control board. Also, according to Claim 7, the control board is secured to the frame member at least at one side on which the interface connector is not mounted, and the control board is secured to the rib of the frame member.

In another aspect, the present invention is an image reading apparatus that comprises a scanning member, movable along an original mounting table, and which includes a reading element for reading an original image and has a frame. A drive source is provided for driving the scanning member, and a frame member houses the scanning member. Also provided is an interface connector connected to a signal line of an external apparatus and mounted on an inside side surface of the frame member, the inside side surface of the frame member being located at the end of a drive direction of the scanning member. In addition, according to Claim 12, the drive source is located at a side surface of the frame of the scanning member in such manner as to move together with the scanning member, and when the scanning member is positioned at the end of a driving movable range on the side at which the drive source is located, the drive source and the interface connector are positioned between the side surface of the frame member and the scanning member, and the drive source is recited as not overlapping with the interface connector in a direction perpendicular to the original mounting table surface.

Still other objects of the present invention, and the features thereof, will become fully apparent from the following detailed description which is to be taken in conjunction with the accompanying drawings.

DETAILED DESCRIPTION OF THE PREFERRED EMBODIMENTS

The present invention will be clarified in detail by preferred embodiments thereof, with reference to the accompanying drawings. However, the dimension, material, shape, relative arrangement etc. of the components in such embodiments are intended to limit the scope of the present invention unless otherwise specified.

First Embodiment

At first there will be explained a first embodiment of the image reading apparatus of the present invention, with reference to FIGS. 1 to 5.

Figure 1:
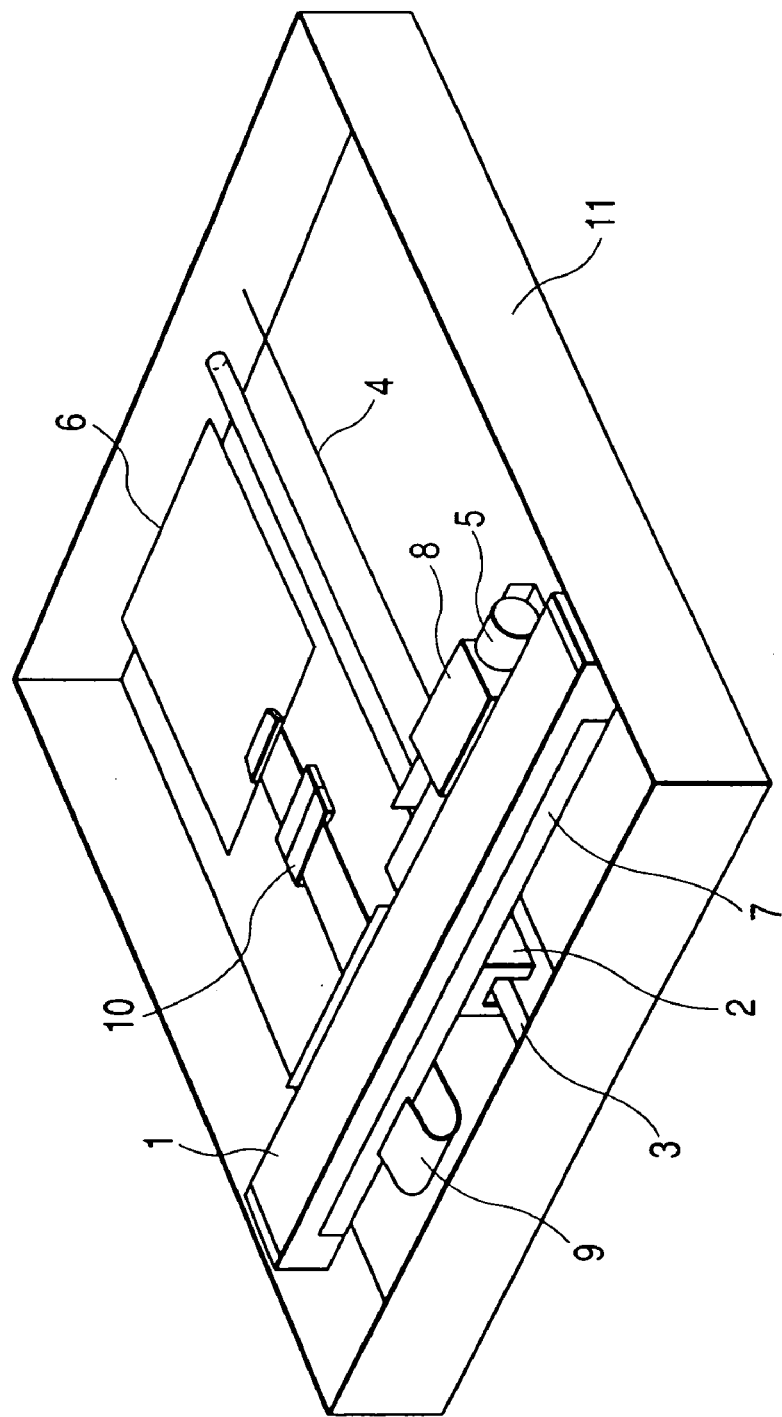
FIG. 1 is a perspective view of an image reading apparatus constituting a first embodiment of the present invention, in a state without an upper part thereof such as an original mounting glass.
Figure 13:
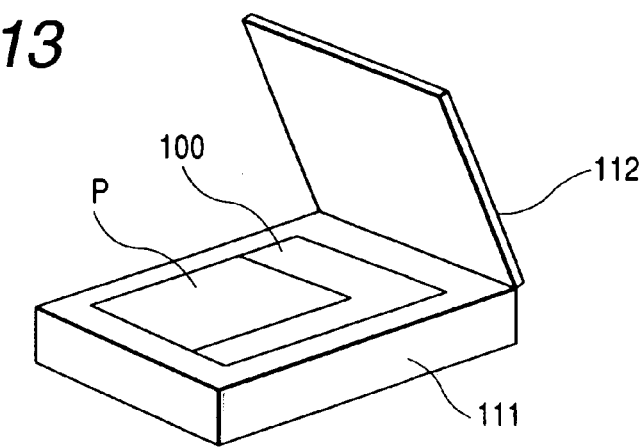
FIG. 13 is a schematic view showing a conventional color image reading apparatus.
Figure 14A:
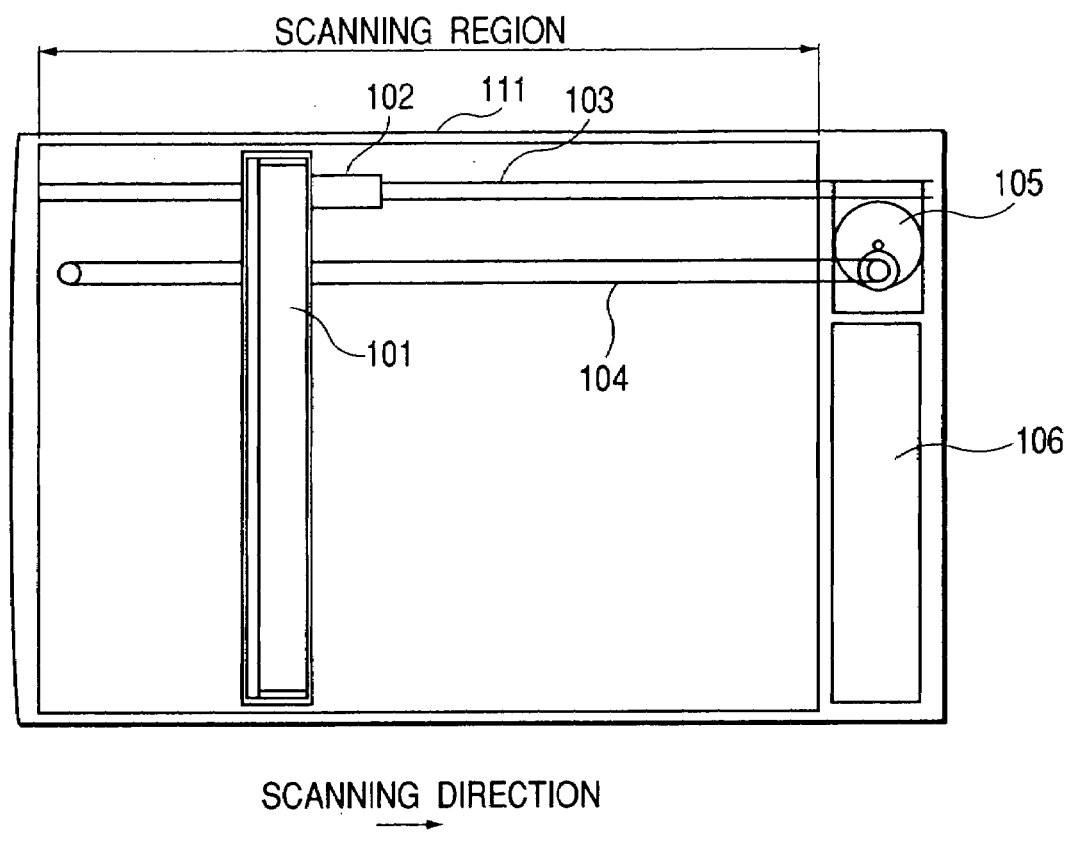
FIGS. 14A and 14B are respectively a plan view and a cross-sectional view of a conventional image reading apparatus.
Figure 14B:
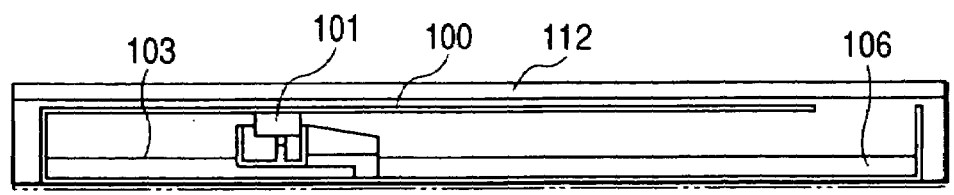
Figure 12A:
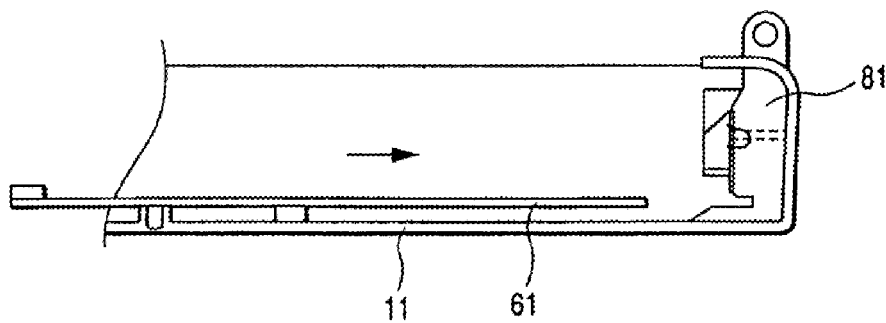
Figure 12B:
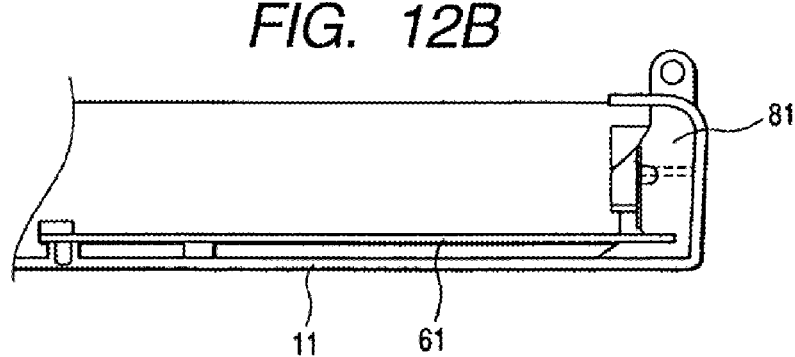
Figure 13:
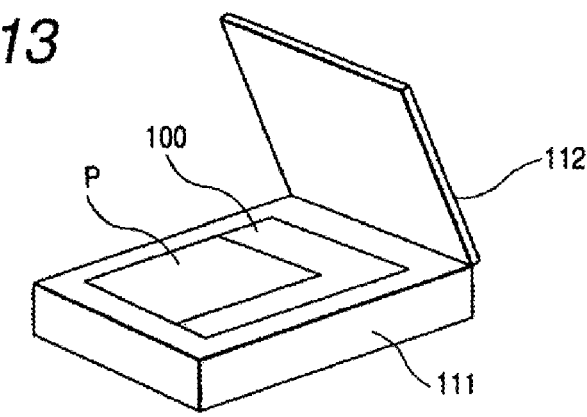
Figure 14A:
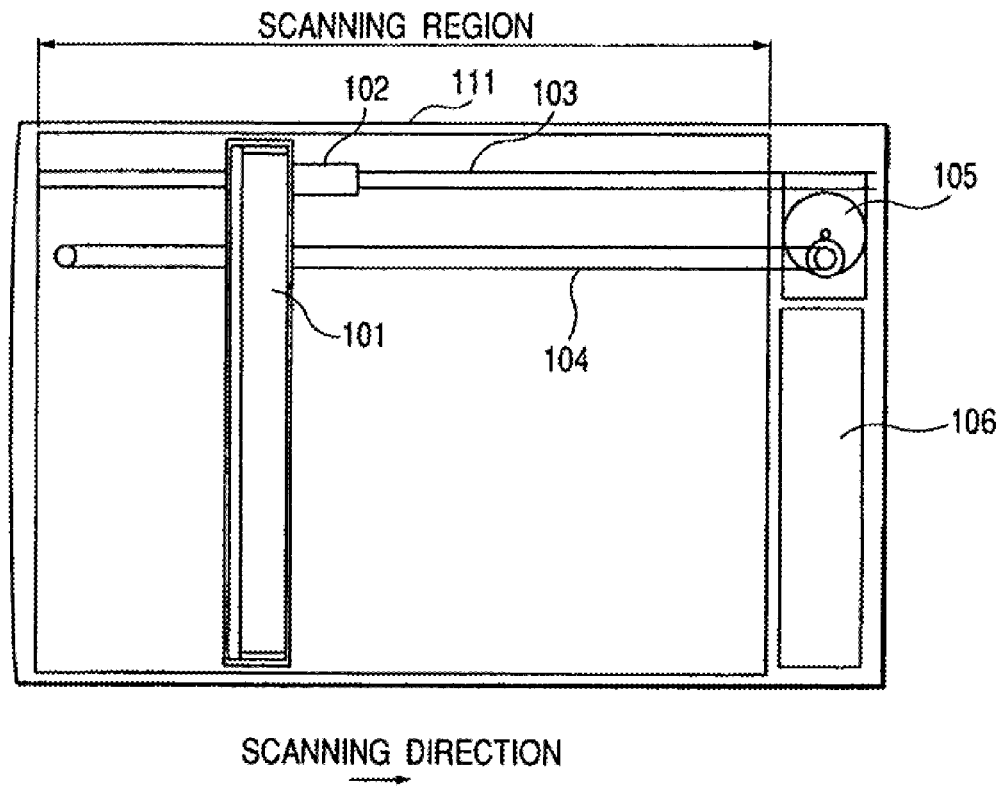
Figure 14B:
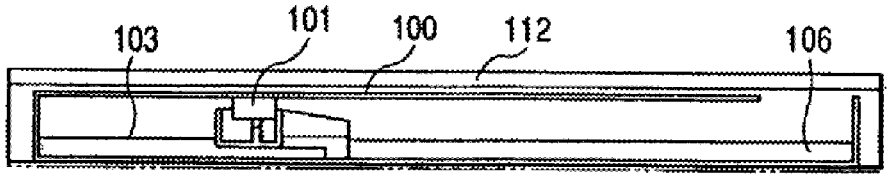

FIG. 1 is a perspective view of the first embodiment of the image reading apparatus of the present invention, in a state without an upper part thereof such as an original mounting glass etc. The external appearance of the image reading apparatus of the present invention is similar to that shown in FIG. 13 which was referred to in the foregoing description of the prior art, and will not, therefore, be explained in further details.

Referring to FIG. 1, a frame member 11 serving as an external cover contains following components therein. An image sensor unit 1 constituting a scanning member for reading the image of the original is provided therein with a light source for illuminating the original, a lens array for focusing the light reflected from the original onto the photosensor element of the image sensor unit 1, and an image sensor.

The image sensor unit 1 is provided on a holder 7 which is equipped with a slider 2 and is slidably supported on a guide shaft 3 fixed to a frame member 11.

The holder 7 is provided with a motor 5 constituting a scanning drive source for moving the image sensor unit 1 along the guide shaft 3.

The frame member 11 incorporates a transmission mechanism such as a synchronized meshing wire 4 for transmitting the driving force of the motor 5 to the holder 7 and the image sensor unit 1.

The synchronized meshing wire 4 is fixed at an end thereof to the frame member 11 and is supported, at a predetermined tension, at the other end by an unrepresented elastic member which is fixed to the frame member 11.

The driving force of the motor 5 is transmitted through speed changing means 8 to a synchronized meshing pulley 14 (cf. FIG. 2) positioned at the rear side of the holder 7 and constituting drive speed changing means.

Figure 5:
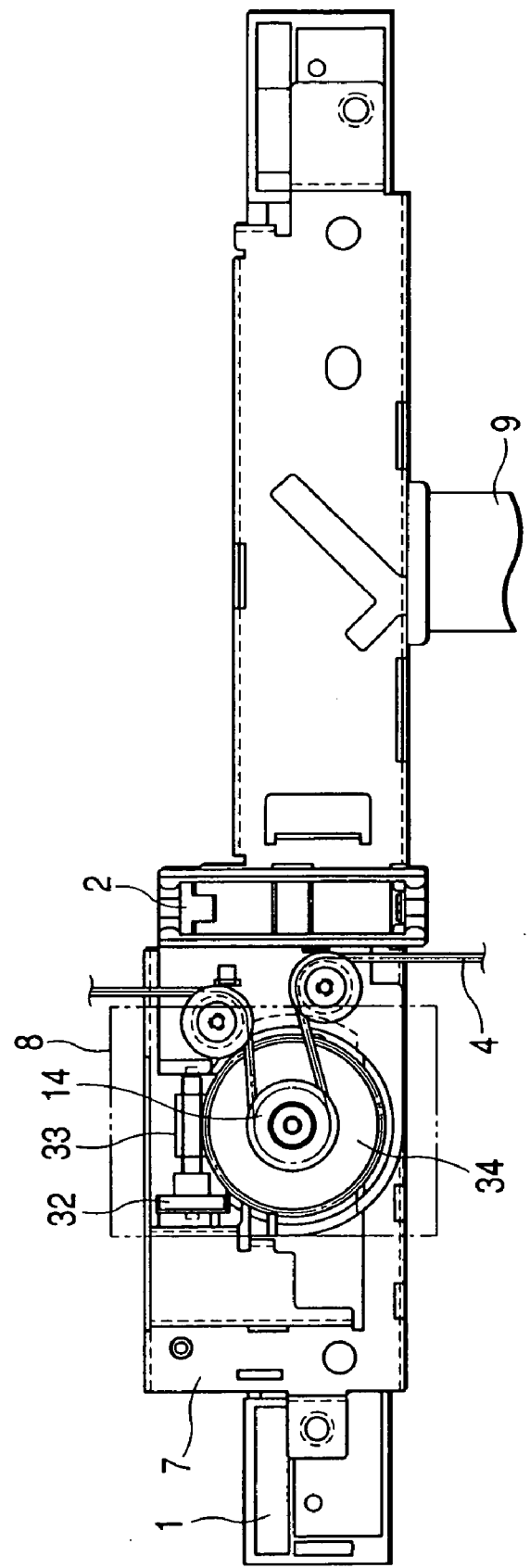

As shown in FIG. 5, the synchronized meshing pulley 14 is so constructed as to maintain synchronized meshing with the synchronized meshing wire 4. Thus, in response to the forward or reverse rotation of the motor 5, the synchronized meshing pulley 14 executes forward or reverse rotation whereby the image sensor unit 1 executes reciprocating motion parallel to the unrepresented original mounting glass.

In the frame member 11, there is also provided a control board 6 which is connected to a flat cable 9 constituting a control signal path for the image sensor unit 1 and the motor 5. The flat cable 9 is fixed at a part thereof to the frame member 11 by a fixing member 10.

Figure 2A:
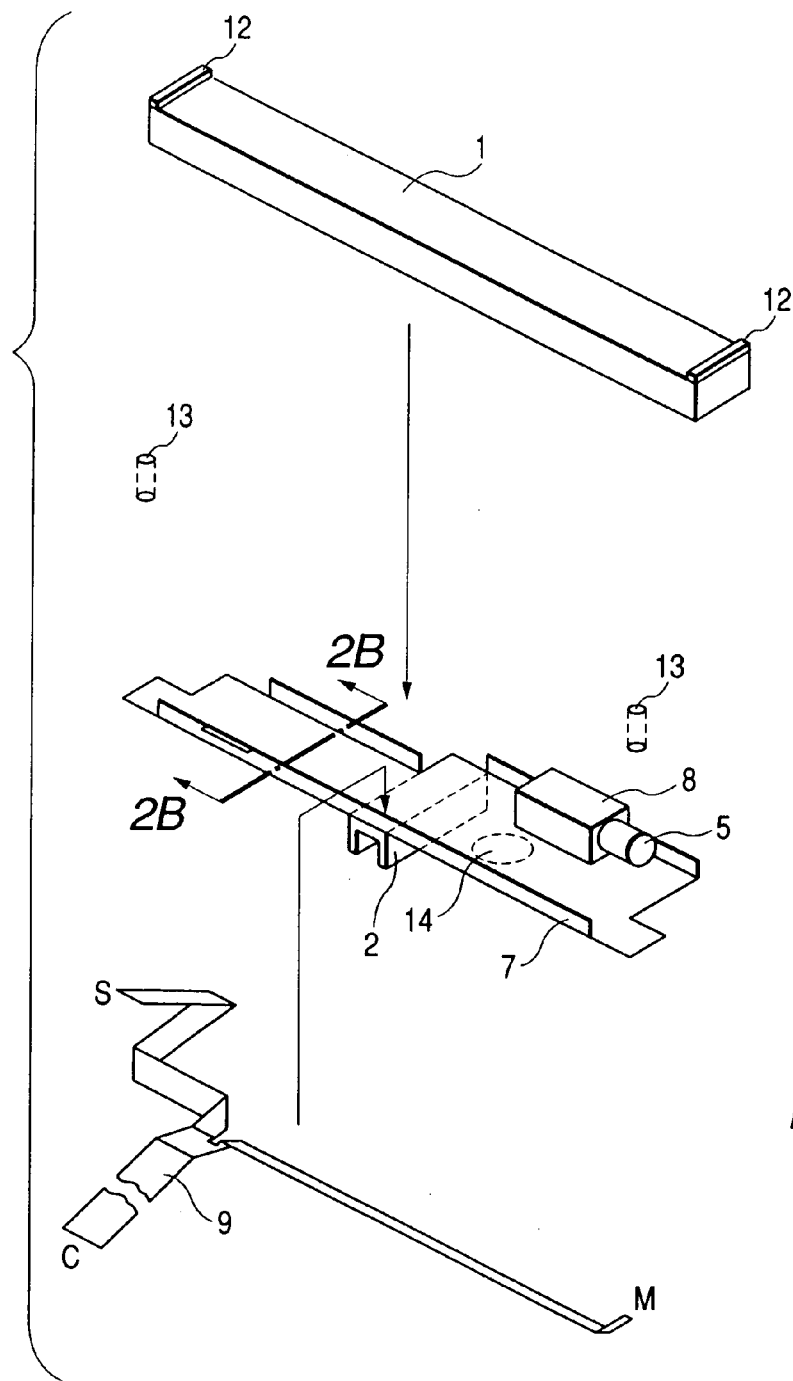
FIG. 2A is an exploded perspective view showing an image sensor unit and a holder portion in the first embodiment of the image reading apparatus.
Figure 2B:
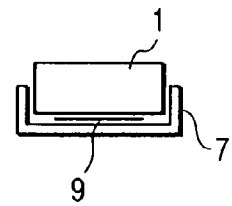
FIG. 2B is a cross-sectional view along a line 2B—2B in FIG. 2A.

FIGS. 2A and 2B are exploded perspective views showing the image sensor unit and the holder provided in the first embodiment of the image reading apparatus of the present invention.

The holder 7 is provided with the aforementioned motor 5, speed changing means 8, synchronized meshing pulley 14 and slider 2.

The image sensor unit 1 is provided, across an elastic member 13 such as a spring, on the holder 7.

On both ends of the image sensor unit 1 in the longitudinal direction thereof there are provided spacers 12 of a material of a low friction coefficient.

The flat cable 9 constituting the control signal path is positioned between the holder 7 and the image sensor unit 1.

The flat cable 9 is connected at an end C thereof to the control board 6 but is branched at the other end on the holder 7, and a branched end S is connected to the image sensor unit 1 while the other branched end M is connected to the motor 5.

A portion of the flat cable 9 connected to the control board 6 is preferably positioned as close as possible to the guide shaft 3 (in the longitudinal direction of the image sensor unit 1) in order to reduce the influence of the moment to the guide shaft 3.

The above-described image reading apparatus involves various moments on the guide shaft 3 constituting guide means for guiding the movement of the scanning member composed of the reading unit 1, slider 2, motor 5, holder 7, speed changing means 8, flat cable 9, synchronized meshing pulley 14 etc.

More specifically, a moment is generated by the holder 7 and the reading unit 1, slider 2, motor 5, speed reducing means 8, flat cable 9, synchronized meshing pulley 14 etc. supported thereon, and another moment is generated by the action force of a biasing member 13 such as a spring provided between the reading unit 1 and the holder 7.

In the image reading apparatus of the present invention, the guide shaft 3 constituting the guide means for guiding the movement of the scanning member is provided in a position where the total sum of the aforementioned moments acting on the scanning member becomes approximately zero.

More specifically, the guide shaft 3 is provided in such a position as to maintain a very small difference between the biasing forces of the scanning member to the original mounting glass at both ends of the scanning member in the longitudinal direction thereof, whereby the scanning member supported by the guide shaft 3 is always well balanced.

In the conventional configuration, the biasing forces of the scanning member to the original mounting glass are extremely different at both ends of the scanning member in the longitudinal direction so that the smooth scanning movement cannot be realized. In the present invention, the difference of such biasing forces at both ends of the scanning member in the longitudinal direction is made extremely small so that the scanning movement can be made smooth.

As the above-described configuration is free from unnecessary force on the scanning movement, it is rendered possible to constantly maintain the scanning member in the balanced state thereby always providing the image reading of high quality and also to minimize the driving force for the scanning member, thereby reducing the electric power consumption of the apparatus.

Thus the image sensor unit 1 executes the scanning movement parallel to the original mounting glass while maintaining a state of a light contact thereto by the spacers 12, thereby reading the image on the original.

In the following there will be explained the functional blocks of the image reading apparatus shown in FIG. 1, with reference to FIG. 3 which is a functional block diagram of the functions provided in the first embodiment of the image reading apparatus of the present invention.

Figure 3:
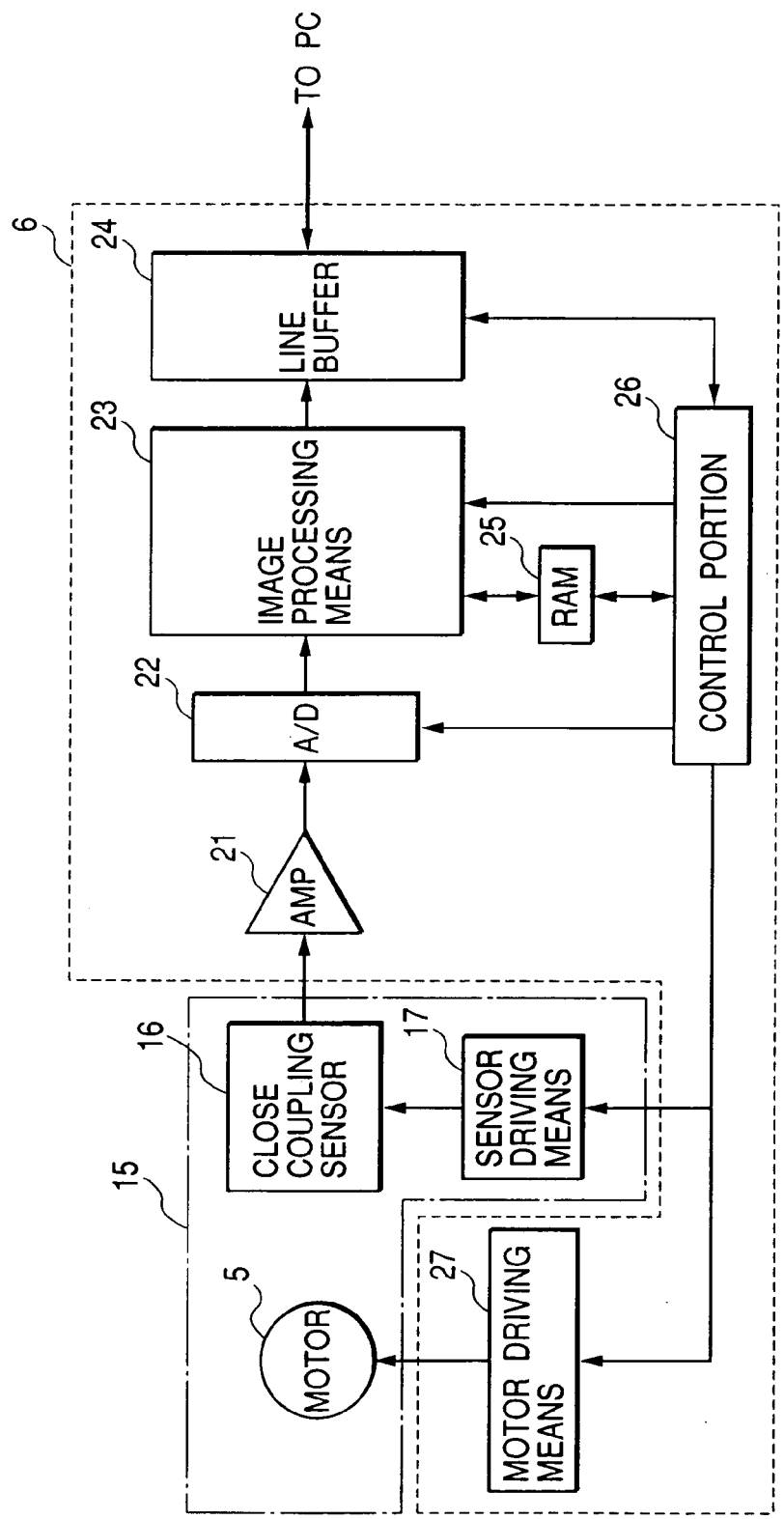
FIG. 3 is a functional block diagram of the first embodiment of the image reading apparatus of the present invention.

In FIG. 3, a chain-lined frame indicates a reading unit 15 corresponding to the scanning member, and a broken-lined frame indicates the aforementioned control board 6.

The image reading apparatus functions by the basic functional blocks in the following manner. At first a control portion 26 drives motor drive means 27 and close coupling type image sensor drive means 17 (represented as sensor drive means in FIG. 3).

The close coupling type image sensor drive means 17 activates the unrepresented three-color LED's in turn, thereby causing a close coupling sensor 16 to execute photoelectric conversion of the light reflected from the original and to accumulate the corresponding charges.

The close coupling sensor 16, close coupling type image sensor drive means 17 and three-color LED's are constructed as an integral unit, and a motor 5 moves the reading unit 15 in the sub scanning direction.

The output signal of the close coupling sensor 16 is amplified by an amplifier 21 and then converted into a digital image signal by an A/D converter 22.

The image signal digitized by the A/D converter 22 is subjected, in image processing means 23, to image processing such as shading correction utilizing shading data stored in a RAM 25, digital gain control and digital black correction.

Thereafter the digital image signal is stored in a line buffer 24 and is transferred, through an interface, to an external equipment such as a personal computer.

All these operations are executed by a control portion 26 which controls the various functional blocks based on instructions from driver means of an external equipment.

In the following there will be explained, with reference to FIGS. 4 and 5, the scanning drive system equipped in the image reading apparatus shown in FIG. 1.

Figure 4:
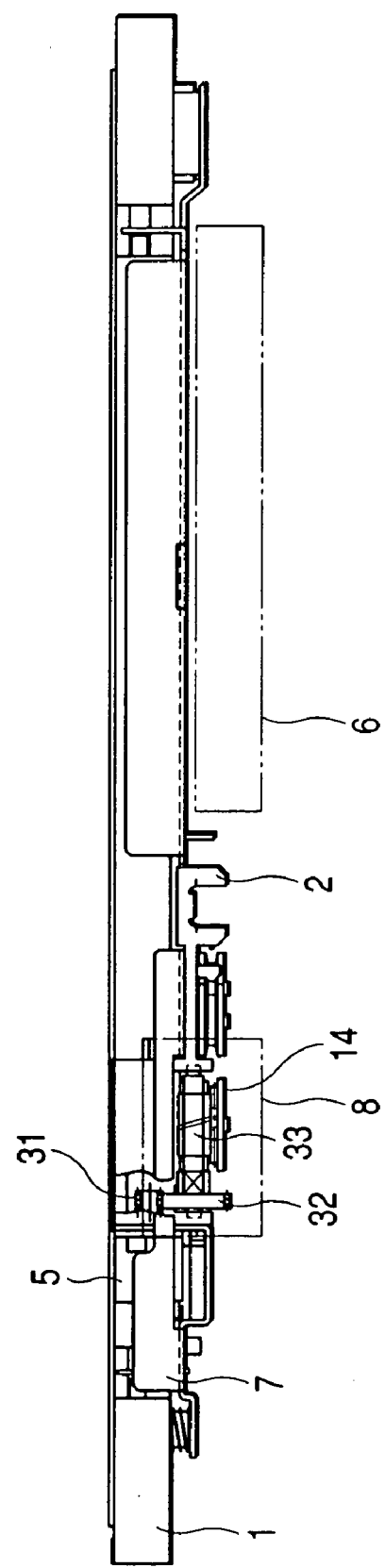
FIGS. 4 and 5 are views showing detailed configuration of a scanning drive system consisting of an image sensor unit, a holder, a motor and speed reducing means and provided in the first embodiment of the image reading apparatus of the present invention.

FIGS. 4 and 5 are views showing the detailed configuration of the scanning drive system, equipped in the first embodiment of the image reading apparatus of the present invention and composed of the image sensor unit 1, holder 7, motor 5 and speed changing means 8. FIG. 4 is a view of the scanning member seen from the scanning direction, while FIG. 5 is a view thereof seen from the bottom side.

In the following there will be explained in detail how the driving force of the motor 5 is transmitted to the synchronized meshing wire 4.

The driving force of the motor 5 is transmitted from a spur gear 31 (having teeth of a number Z1) constituting the drive transmission means on the motor shaft to a spur gear 32 (having teeth of a number Z2), and then transmitted to a worm gear 33 (having teeth of a number Z3) provided coaxially with the spur gear 32.

The worm gear 33 then drives a helical gear 34 meshing therewith and further drives the synchronized meshing pulley 14 provided coaxially with the helical gear 34, from which the driving power is transmitted to the synchronized meshing wire 4.

The load torque T' on the motor shaft can be represented as follows, in the same manner as already explained in the conventional configuration:

$$T' = F' \times D'/2 \times i' \times 1/\eta'$$

wherein F': load in the axial direction, D': diameter of the final pulley, i': speed reducing ratio, $\eta'$: mechanical efficiency.

The drive system of the present embodiment loses the mechanical efficiency to about half because of the use of the worm gear 33 instead of the spur gear, but the speed reducing ratio i' can be represented by $i'=Z1/(Z2 \times Z3)$ so that the load torque on the motor shaft can be made considerably small by employing a larger number of teeth in the helical gear 34.

For example, if the load F' in the axial direction, the diameter D' of the final pulley and Z1/Z2 are same as those in the aforementioned conventional configuration but the mechanical efficiency η' and Z3 are selected as $\eta'=\eta/2$ and Z3=20, the load torque on the motor shaft is reduced to 1/10 in comparison with the conventional configuration.

Consequently such system can be sufficiently driven with a motor of a diameter of 6 to 10 mm.

Thus, the drive system including the speed changing means 8 is made compact and is provided under the holder 7, so as to be contained as far as possible within the area of the image sensor, in order to achieve effective utilization of the space.

The use of the worm gear 33 in the drive system as explained in the foregoing allows to achieve a large speed changing or reducing ratio within a limited space.

Also, the use of such compact drive system allows, without changing the entire width of the apparatus, to secure a width for positioning the control board 6 within a space not interfering with the drive system under the holder 7 as shown in FIG. 4.

More specifically, as shown in FIG. 4, the control board 6 is provided in a position not interfering with the drive system protruding from the bottom face of the scanning member, namely in a position opposite to lower protruding portion of the scanning member with respect to the guide member 3 (or slider 2), whereby the space under the scanning member can be effectively utilized to reduce the thickness of the apparatus.

In this manner it is rendered possible to eliminate the wasted space and to reduce the thickness of the apparatus without increasing the footprint of the entire apparatus.

In addition, the guide shaft 3 constituting the guide means for guiding the movement of the image sensor unit 1 and the synchronized meshing wire 4 are positioned approximately at the center of gravity of the image sensor 1 between the drive system and the control board 6 to minimize necessary the driving power of the drive source such as the motor 5 and to achieve stable scanning operation, whereby obtained is a high quality image without image blur.

Figure 6:
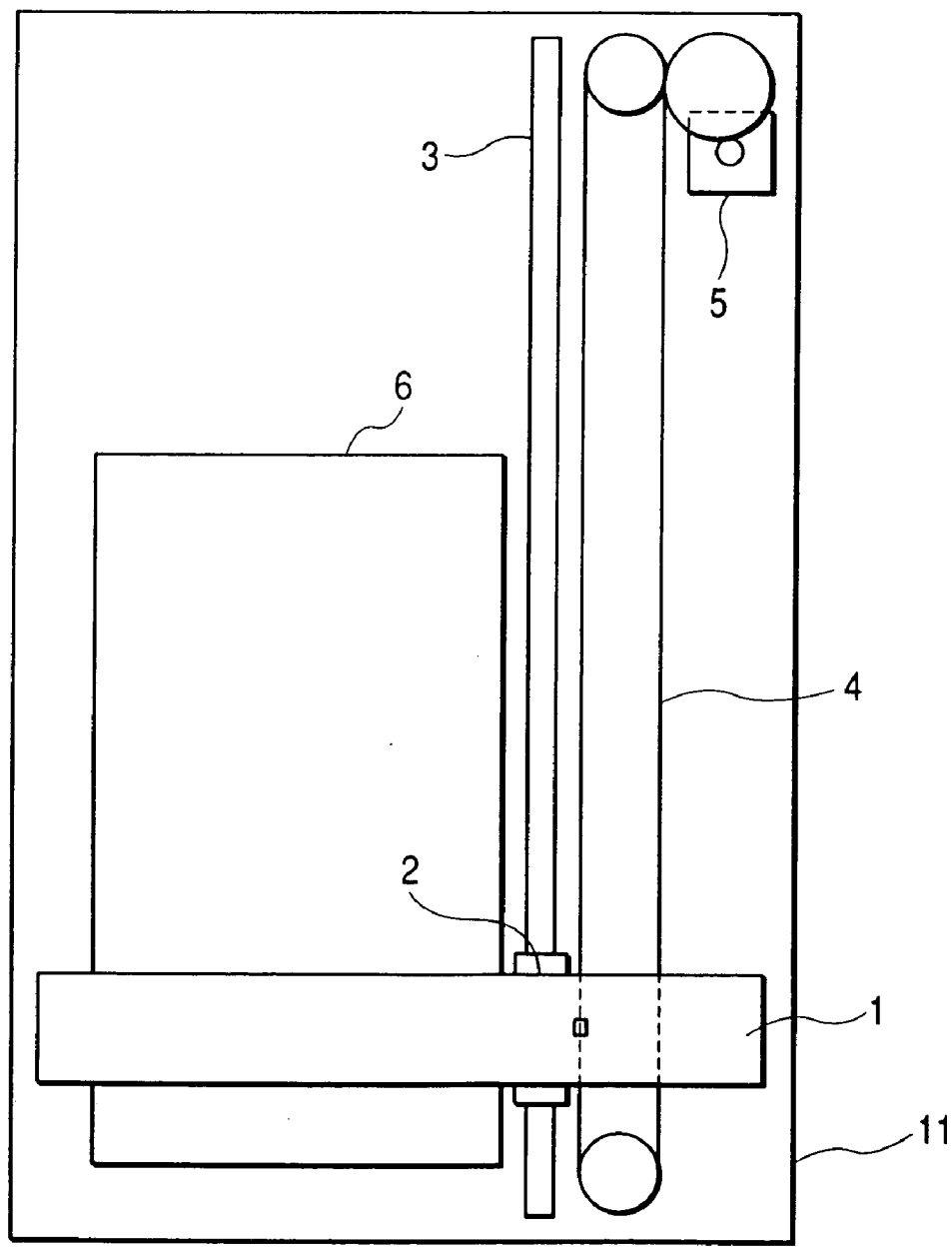
FIG. 6 is a plan view of a variation of the first embodiment of the image reading apparatus of the present invention.

In the foregoing embodiment, there has been explained a configuration in which the motor 5 constituting the drive source is provided in the image sensor unit 1 constituting the scanning member, but the image reading apparatus of the present invention is not limited to such configuration and the scanning drive source may also be provided in the apparatus. Such image reading apparatus will be explained in the following with reference to FIG. 6, which is a plan view of a variation of the first embodiment of the image reading apparatus of the present invention. In FIG. 6, components equivalent to those in FIG. 1 are represented by corresponding numbers. A number 20 indicates a fixing portion for the wire 4 and the scanning member 1.

In the image reading apparatus shown in FIG. 6, the control board 6 is positioned under the image sensor unit 1 and the motor 5 is provided in an upper right portion of the apparatus. Such image reading apparatus also can achieve a reduction in the thickness, though the dimension of the apparatus is somewhat redundant. More specifically, the control board 6 is positioned opposite, with respect to the guide member 3, to the drive system including the motor 5, wire 4 etc. so that the space under the scanning member can be effectively utilized to suppress the thickness of the apparatus.

As explained in the foregoing, in the first embodiment of the image reading apparatus of the present invention, the drive system for the image sensor unit 1 and the control board 6 are so positioned that they do not mutually interfere during the movement of the image sensor unit 1 whereby provided is a compact image reading apparatus with a reduced thickness.

Second Embodiment

In the following there will be explained a second embodiment of the image reading apparatus of the present invention, with reference to FIGS. 7 to 9B.

However, the image reading apparatus of the second embodiment is different from that of the first embodiment in the installation structure of the control board but is same in other configurations such as the functional blocks and the structure of the scanning drive system, so that such same configurations are represented by same numbers and will not be explained further.

Figure 7:
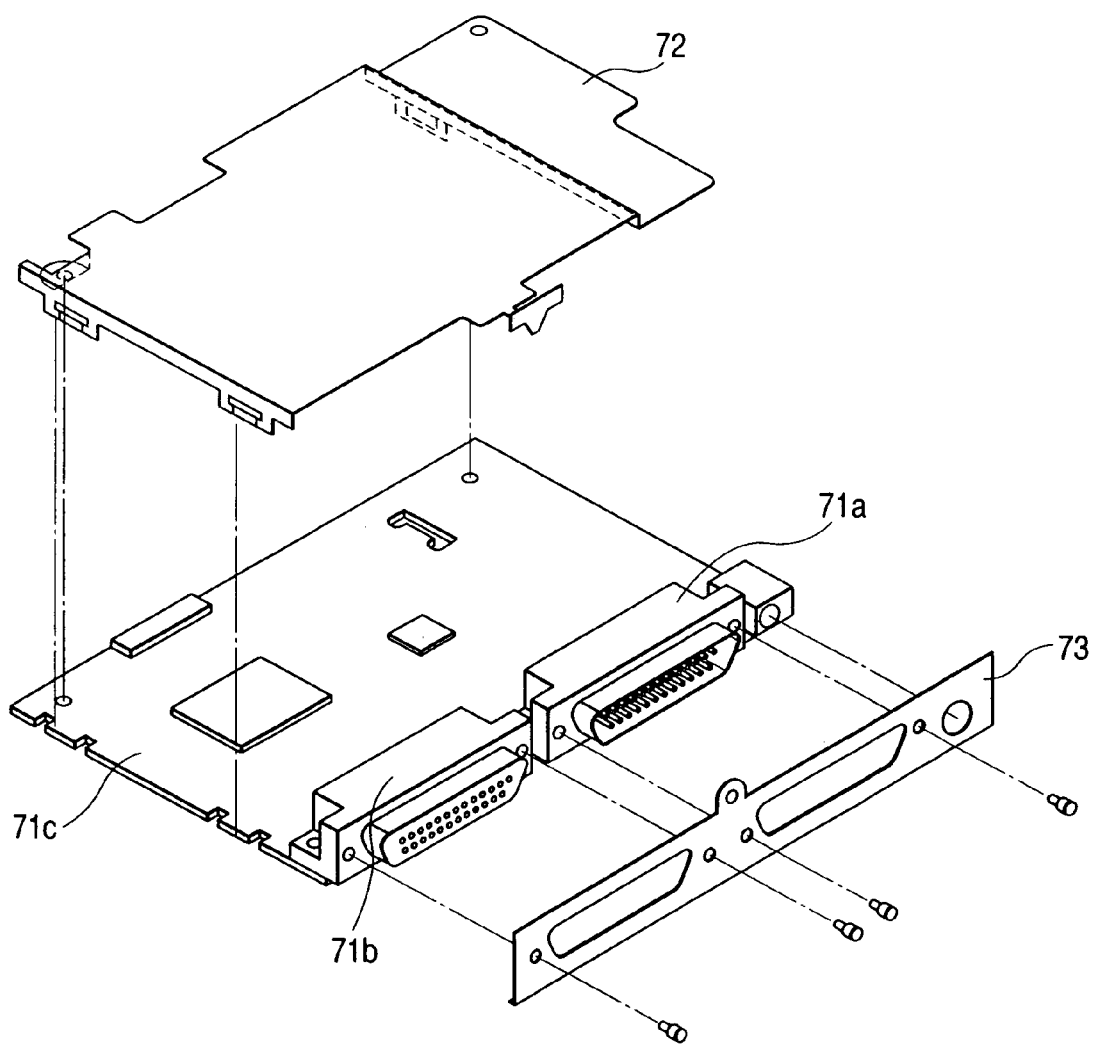
FIGS. 7 and 8 are perspective views showing the configuration of a control board provided in a second embodiment of the image reading apparatus of the present invention.
Figure 8:
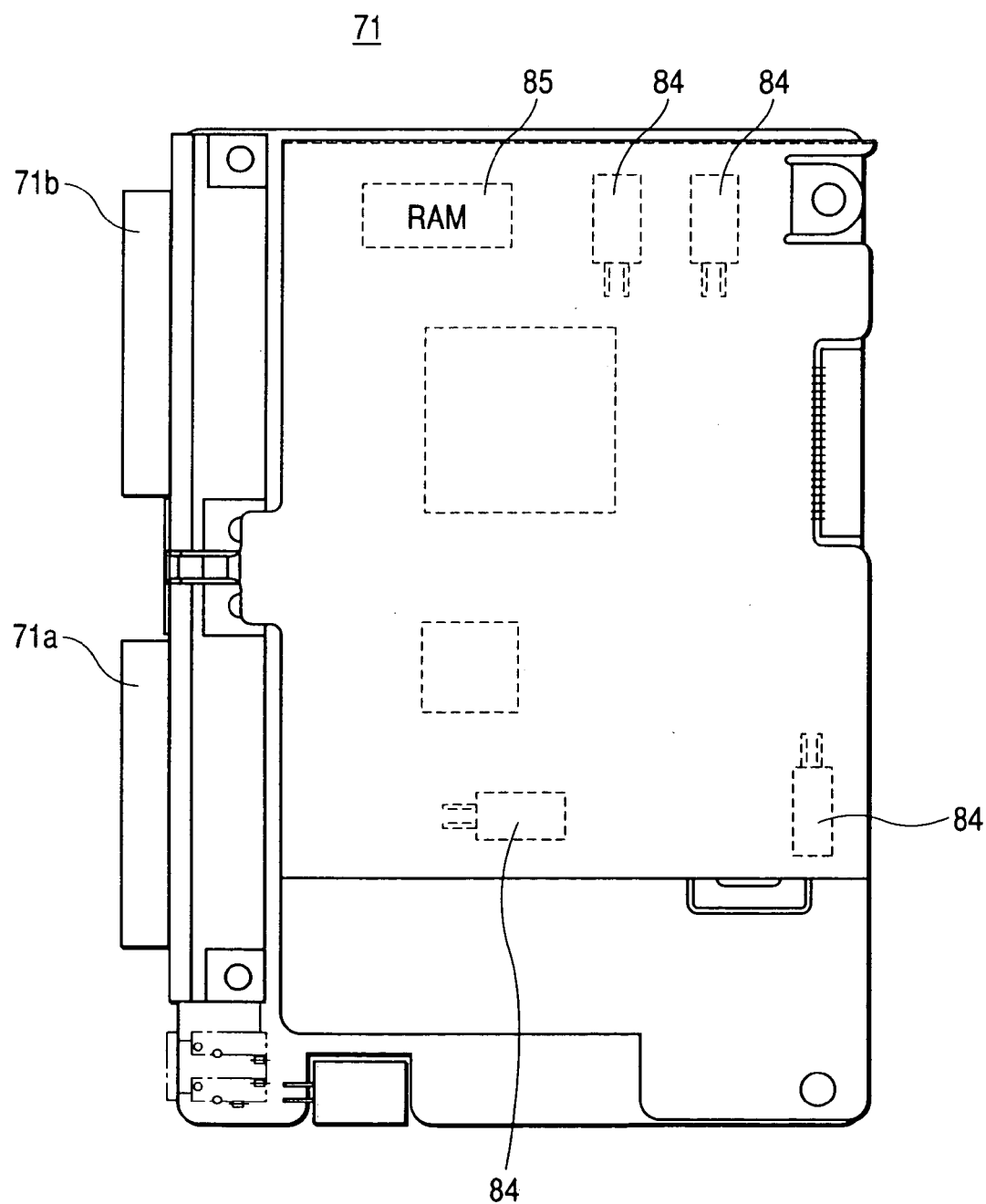
Figure 9A:
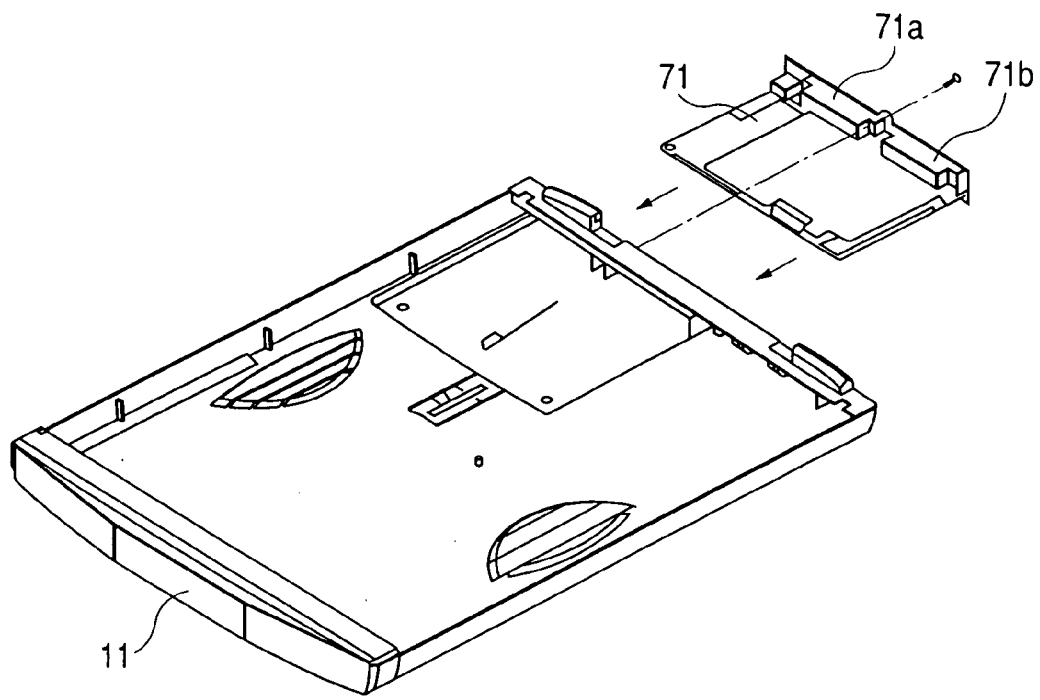
FIGS. 9A and 9B are perspective views showing the mode of mounting of the control board, provided in the second embodiment of the image reading apparatus, in a frame member.
Figure 9B:
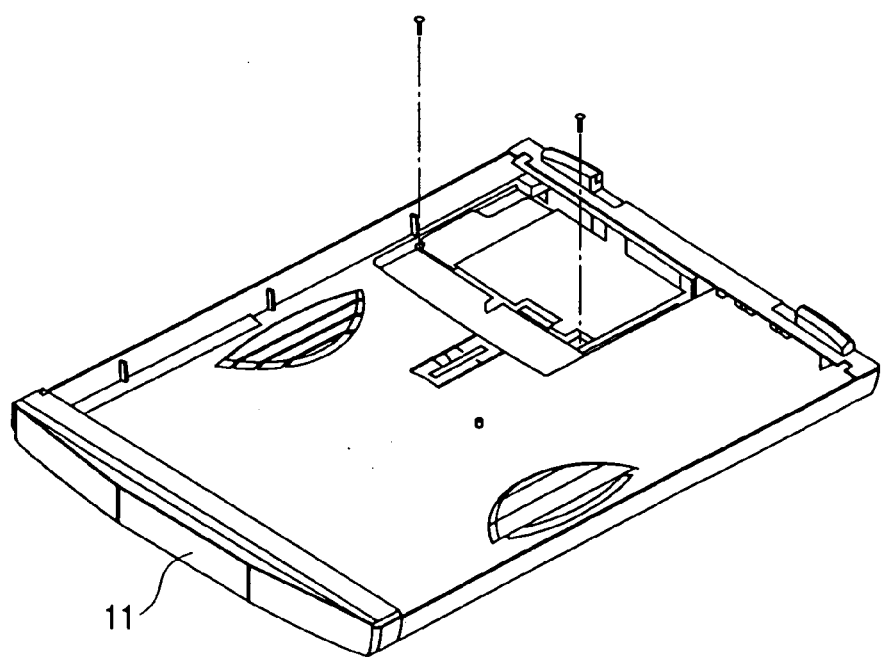

FIGS. 7, 8, 9A and 9B illustrate the second embodiment of the image reading apparatus of the present invention and show the configuration of a control board with a parallel interface (having a large interface connector) (FIGS. 7 and 8) and a fixing method to the frame member (FIGS. 9A and 9B). More specifically, FIGS. 7 and 8 show the configuration of the control board employed in the second embodiment of the present invention, and FIGS. 9A and 9B are schematic views showing a method of fixing the control board, provided in the second embodiment of the image reading apparatus, to the frame member thereof.

In FIG. 7, there are shown a control board 71 consisting of a mounting board 71c to which an interface connector 71a for connection with the personal computer and an interface connector 71b for connection with the printer are soldered, a board cover 72 with shielding effect, and a parallel connector cover 73.

As shown in FIG. 8, components of a larger height such as an ordinary electrolytic capacitor 84 and a RAM 85 as a momory mounted on the control board 71 are positioned close to the bent portion of the board cover 72 in order to avoid influence of eventual curvature of the ceiling part of the board cover 72.

Also the control board 72 itself is maintained substantially flat and is prevented from curvature in the vicinity of the parallel port by the soldering of the large parallel port.

As shown in FIG. 9A, the control board 71 is inserted from the back side of the frame member 11 and, as shown in FIG. 9B, is positioned in the direction of height by a hook provided in the frame member 11 in such a manner that the height at a central portion opposite to the parallel connector becomes same as that of screw holes on both ends.

Therefore the curvature is corrected also in a portion opposite to the parallel port, so that the control board is fixed to the frame member 11 in such a manner that the substantially entire board becomes flat.

In the present embodiment, therefore, there is not required a flattening operation for the ceiling part of the board cover 72. Also ordinary electrolytic capacitor and memories can be employed to reduce the cost and to minimize the height of the control board 71.

Also the apparatus can be made compact and minimized in thickness, since the entire control board 71 is prevented from curvature to minimize the clearance to the scanning member.

As explained in the foregoing, the second embodiment of the image reading apparatus allows to suppress the curvature of the control board 71 with a lowered cost, thereby realizing compactization and reducing in the thickness of the apparatus.

Third Embodiment

In the following there will be explained a third embodiment of the image reading apparatus of the present invention, with reference to FIGS. 10, 11A, 11B, 12A and 12B.

However, the image reading apparatus of the third embodiment is different from that of the first embodiment in the installation structure of the control board but is same in other configurations such as the functional blocks and the structure of the scanning drive system, so that such same configurations are represented by same numbers and will not be explained further.

Figure 10:
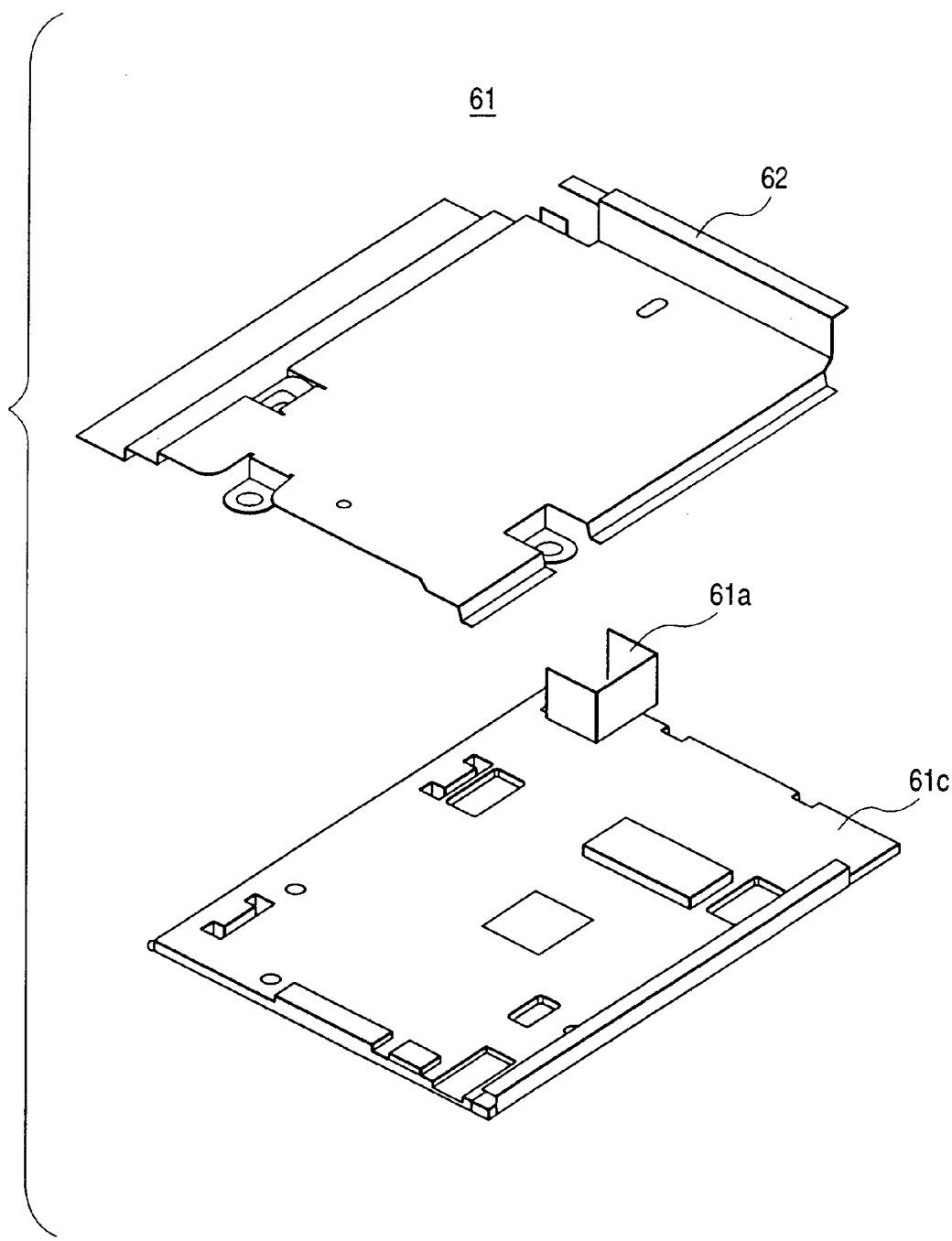
FIG. 10 is a perspective view showing the configuration of a control board provided in a third embodiment of the image reading apparatus of the present invention.

FIGS. 10, 11A, 11B, 12A and 12B show the configuration of a control board with an interface of universal serial bus (USB) type (having a small interface connector) (FIG. 10) and a fixing method to the frame member (FIGS. 11A, 11B, 12A and 12B). More specifically, FIG. 10 shows the configuration of the control board employed in the third embodiment of the present invention, and FIGS. 11A, 11B, 12A and 12B are schematic views showing a method of fixing the control board, provided in the third embodiment of the image reading apparatus, to the frame member thereof.

In FIG. 10, there are shown a control board 61 consisting of a mounting board 61c to which a USB connector 61a for connection with the personal computer is soldered.

A board cover 62 is provided with a shielding effect. As in the second embodiment, components of a larger height such as an ordinary electrolytic capacitor 84 and a RAM 85 mounted on the control board 61 are positioned close to the bent portion of the board cover 62 in order to avoid influence of eventual curvature of the ceiling part of the board cover 62.

Figure 11A:
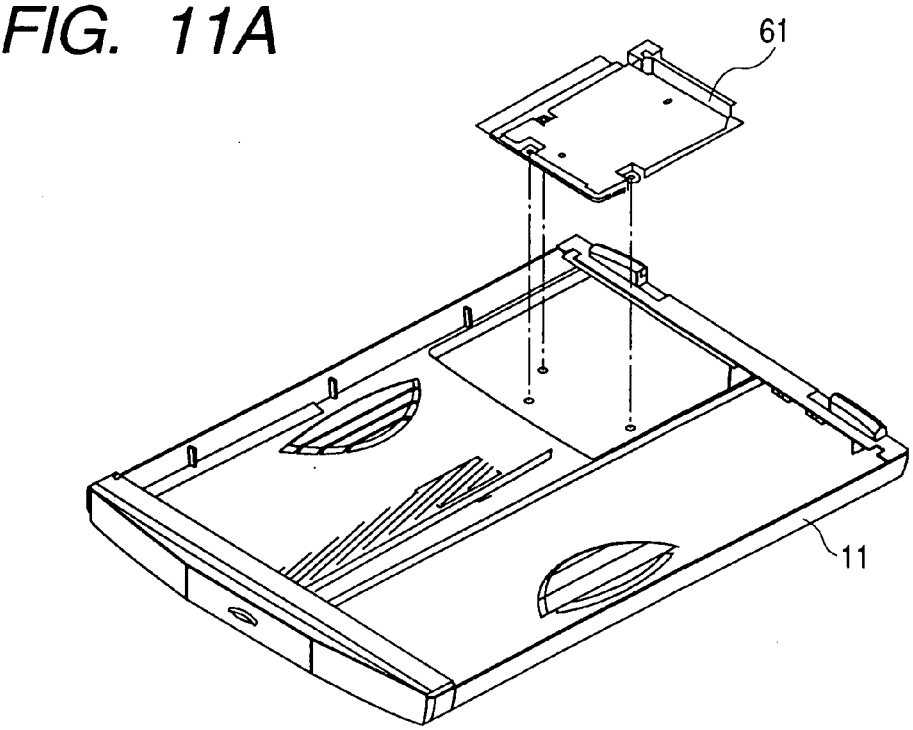
FIGS. 11A, 11B, 12A and 12B are perspective views showing the mode of mounting of the control board, provided in the third embodiment of the image reading apparatus, in a frame member.
Figure 11B:
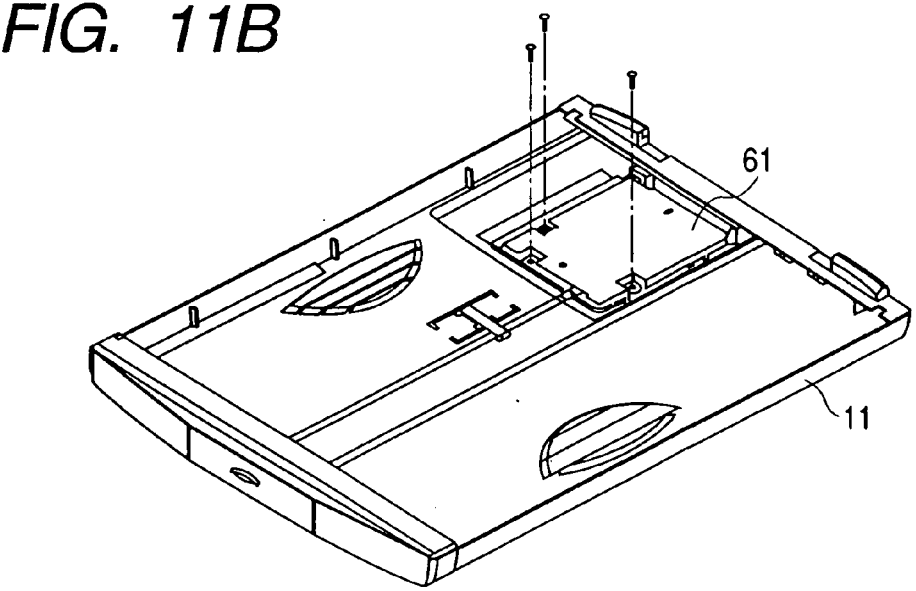

The control board 61 is inserted from the upper side of the frame member 11 as shown in FIG. 11A, and is fixed thereto with screws on three sides other than that of the USB connector as shown in FIG. 11B. The portions of the control board 61 for receiving three fixing screws are so formed as to be flat, as shown in FIG. 12B.

Figure 12A:
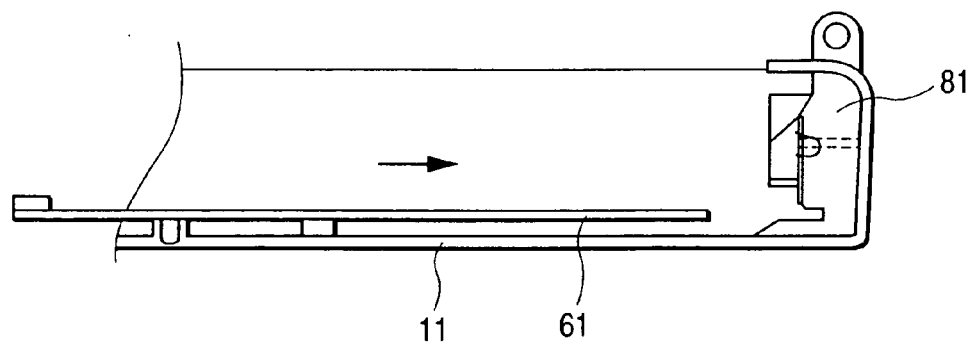
Figure 12B:
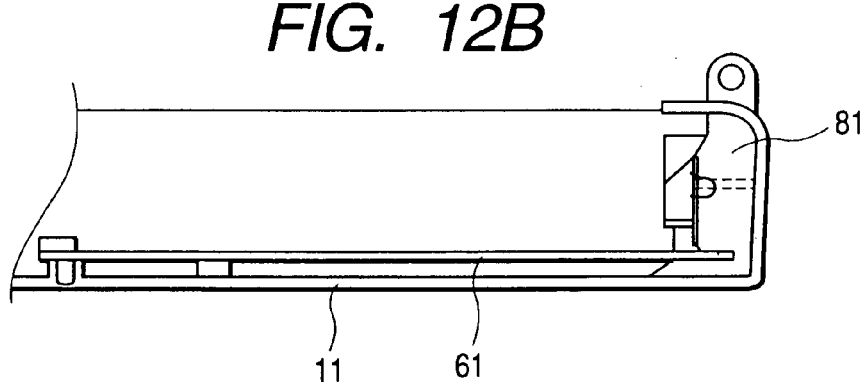

The connector side is positioned by engaging with a rib 81 provided on the frame member as shown in FIGS. 12A and 12B. The receiving portion therefor of the control board 61 is also so constructed as to be flat.

Therefore, each side of the control board 61 is corrected for curvature, whereby the control board 61 is fixed in an entirely flat state to the frame member 11.

In the present third embodiment, therefore, there is not required a flattening operation for the ceiling part of the board cover. Also ordinary electrolytic capacitor and memories can be employed to reduce the cost and to minimize the height of the control board 61.

Also the apparatus can be made compact and minimized in thickness, since the entire control board 61 is prevented from curvature to minimize the clearance to the scanning member.

In the second and third embodiments of the image reading apparatus of the present invention, the bent portion need not necessarily be provided in the board cover but may be provided in the mounting board. Also the control board need not necessarily be composed of the mounting board covered by the board cover, but may be composed of a mounting board having the above-mentioned bent portion and lacking the board cover.

The image sensor unit and the scanning drive system employed in the foregoing first to third embodiments are of a very low electric power consumption, so that the electric power consumption of the entire image reading apparatus in the driven state can be suppressed to 2.5 W or lower.

Such electric power can be supplied to the peripheral equipment from the USB interface which is rapidly becoming popular in the personal computers, so that the image reading apparatus such as the scanner of the present invention, equipped with the USB interface, does not required a power supply unit as necessitated in the conventional products but can be operated by mere connection to the personal computer.

What is claimed is:

1. An image reading apparatus comprising:
   a scanning member, movable along an original mounting table, that includes a reading element for reading an original image;
   a frame member of said image reading apparatus housing said scanning member, supporting said original mounting table on one surface of said frame, and having a rib provided on a side surface of said frame and extending from said one surface of said frame to a surface opposite to said one surface of said frame;
   a control board for controlling said scanning member; and
   an interface connector connected to a signal line of an external apparatus, and mounted on a side of said control board,
   wherein said control board is secured to said frame member at least at one side on which said interface connector is not mounted, and
   wherein said control board is secured to said rib of said frame member.

2. An image reading apparatus according to claim 1, further comprising a conductive board cover covering said control board.

3. An image reading apparatus according to claim 1, wherein at least one side of said control board, which is not secured to said rib, is secured by a screw to said frame member.

4. An image reading apparatus comprising:
   a scanning member, movable along an original mounting table, that includes a reading element for reading an original image, said scanning member having a frame;
   a drive source for driving said scanning member;
   a frame member of said image reading apparatus housing said scanning member and supporting the original mounting table on one surface of said frame member, and having a rib that is provided on a side surface of said frame member and that extends from said one surface of said frame member to a surface opposite to said one surface of said frame member;
   an interface connector connected to a signal line of an external apparatus and mounted on an inside side surface of said frame member, wherein the inside side surface of said frame member is located at the end of a drive direction of said scanning member; and
   a control board, said interface connector being provided on said control board, and said control board being supported on said one surface of said frame member and engaging said rib, wherein said drive source is located at a side surface of said frame of said scanning member in such manner as to move together with said scanning member, and when said scanning member is positioned at the end of a driving movable range on the side at which said drive source is located, said drive source and said interface connector are positioned between the side surface of said frame member and said scanning member, and wherein said drive source does not overlap with said interface connector in a direction perpendicular to the original mounting table surface.

5. An image reading apparatus according to claim 4, further comprising a control board adapted to control movement of said scanning member, and provided in said frame member, wherein said interface connector is mounted on a side of said control board.

* * * * *

UNITED STATES PATENT AND TRADEMARK OFFICE
CERTIFICATE OF CORRECTION

| | | |
|---|---|---|
| PATENT NO. | : 7,161,716 B1 | |
| APPLICATION NO. | : 09/655487 | |
| DATED | : January 9, 2007 | |
| INVENTOR(S) | : Shigeru Kawasaki et al. | |

It is certified that error appears in the above-identified patent and that said Letters Patent is hereby corrected as shown below:

ON THE TITLE PAGE [73]:

Assignee, "Canon Kabsuhiki Kaisha, Tokyo (JP)" should read --Canon Kabushiki Kaisha, Tokyo (JP)--.

Delete Drawing Sheet 12 and 13 and Substitute therefor the Drawings Sheets consisting of FIGS 12A-14B as shown on the attached pages.

COLUMN 1:

Line 34, "color" should read --colors--.

COLUMN 2:

Line 61, "claim 7," should read --claim 1,--.

COLUMN 3:

Line 8, "claim 12," should read --claim 4,--.

COLUMN 7:

Line 41, "quiding" should read --guiding--.

COLUMN 8:

Line 45, "momory" should read --memory--.

UNITED STATES PATENT AND TRADEMARK OFFICE
CERTIFICATE OF CORRECTION

PATENT NO. : 7,161,716 B1
APPLICATION NO. : 09/655487
DATED : January 9, 2007
INVENTOR(S) : Shigeru Kawasaki et al.

It is certified that error appears in the above-identified patent and that said Letters Patent is hereby corrected as shown below:

COLUMN 10:

Line 16, "required" should read --require--.

Signed and Sealed this

Twenty-fifth Day of March, 2008

JON W. DUDAS
*Director of the United States Patent and Trademark Office*